(12) United States Patent
Tosic et al.

(10) Patent No.: US 10,136,116 B2
(45) Date of Patent: Nov. 20, 2018

(54) OBJECT SEGMENTATION FROM LIGHT FIELD DATA

(71) Applicants: Ivana Tosic, San Francisco, CA (US); Anupama Kuruvilla, Wyoming, MI (US); Kathrin Berkner, Los Altos, CA (US); Jelena Kovacevic, Pittsburgh, PA (US)

(72) Inventors: Ivana Tosic, San Francisco, CA (US); Anupama Kuruvilla, Wyoming, MI (US); Kathrin Berkner, Los Altos, CA (US); Jelena Kovacevic, Pittsburgh, PA (US)

(73) Assignees: RICOH COMPANY, LTD., Tokyo (JP); CARNEGIE MELLON UNIVERSITY, Pittsburgh, PA (US)

( * ) Notice: Subject to any disclaimer, the term of this patent is extended or adjusted under 35 U.S.C. 154(b) by 12 days.

(21) Appl. No.: 15/253,037

(22) Filed: Aug. 31, 2016

(65) Prior Publication Data

US 2017/0256059 A1    Sep. 7, 2017

Related U.S. Application Data

(60) Provisional application No. 62/304,507, filed on Mar. 7, 2016.

(51) Int. Cl.
*G06K 9/34* (2006.01)
*H04N 13/128* (2018.01)
(Continued)

(52) U.S. Cl.
CPC .............. *H04N 13/128* (2018.05); *G06T 7/11* (2017.01); *G06T 7/12* (2017.01); *G06T 7/149* (2017.01);
(Continued)

(58) Field of Classification Search
None
See application file for complete search history.

(56) References Cited

U.S. PATENT DOCUMENTS

| 4,658,372 | A | 4/1987 | Witkin | |
|---|---|---|---|---|
| 6,332,034 | B1 * | 12/2001 | Makram-Ebeid | ........ G06K 9/34 382/128 |

(Continued)

FOREIGN PATENT DOCUMENTS

| EP | 1978754 A3 | 10/2008 |
|---|---|---|
| EP | 2375746 A1 | 10/2011 |
| WO | WO 2010/120591 A1 | 10/2010 |

OTHER PUBLICATIONS

Tosic et al., "Light field scale-depth space transform for dense depth estimation", Proc. IEEE Conf. Comput. Vis. Pattern Recognit. Workshops (CVPRW), pp. 441-448, Jun. 2014.*

(Continued)

*Primary Examiner* — Feng Niu
(74) *Attorney, Agent, or Firm* — Fenwick & West LLP

(57) ABSTRACT

A scene is segmented into objects based on light field data for the scene, including based on image pixel values (e.g., intensity) and disparity map(s). In one aspect, the light field data is used to estimate one or more disparity maps for the scene taken from different viewpoints. The scene is then segmented into a plurality of regions that correspond to objects in the scene. Unlike other approaches, the regions can be variable-depth. In one approach, the regions are defined by boundaries. The boundaries are determined by varying the boundary to optimize an objective function for the region defined by the boundary. The objective function is based in part on a similarity function that measures a similarity of image pixel values for pixels within the boundary and also measures a similarity of disparities for pixels within the boundary.

16 Claims, 6 Drawing Sheets

(51) Int. Cl.

| | |
|---|---|
| *G06T 7/557* | (2017.01) |
| *G06T 7/149* | (2017.01) |
| *G06T 7/11* | (2017.01) |
| *G06T 7/12* | (2017.01) |
| H04N 13/00 | (2018.01) |
| G06T 7/162 | (2017.01) |

(52) U.S. Cl.
CPC .............. *G06T 7/557* (2017.01); *G06T 7/162* (2017.01); *G06T 2200/04* (2013.01); *G06T 2200/21* (2013.01); *G06T 2207/10052* (2013.01); *G06T 2207/20016* (2013.01); *H04N 2013/0081* (2013.01)

(56) References Cited

U.S. PATENT DOCUMENTS

| | | | |
|---|---|---|---|
| 6,711,293 B1 | 3/2004 | Lowe | |
| 6,856,314 B2 | 2/2005 | Ng | |
| 6,954,202 B2 | 10/2005 | Han et al. | |
| 7,199,793 B2 | 4/2007 | Oh et al. | |
| 7,382,897 B2 | 6/2008 | Brown et al. | |
| 7,633,511 B2 | 12/2009 | Shum et al. | |
| 8,077,988 B2 | 12/2011 | Donoho | |
| 8,165,215 B2 | 4/2012 | Aharon et al. | |
| 8,244,058 B1 | 8/2012 | Intwala et al. | |
| 8,315,476 B1 | 11/2012 | Georgiev et al. | |
| 8,358,819 B2* | 1/2013 | Wu .................... | G06K 9/4638 382/128 |
| 8,478,044 B2* | 7/2013 | Grady .................. | G06T 7/162 382/128 |
| 8,514,269 B2* | 8/2013 | Adler .................. | G06T 5/002 348/46 |
| 8,619,082 B1* | 12/2013 | Ciurea .................. | G06T 7/593 345/427 |
| 8,761,534 B2 | 6/2014 | Shroff et al. | |
| 8,780,113 B1* | 7/2014 | Ciurea .................. | G06T 7/593 345/427 |
| 8,941,750 B2 | 1/2015 | Yamamoto | |
| 9,092,890 B2 | 6/2015 | Tosic et al. | |
| 9,113,043 B1 | 8/2015 | Kim et al. | |
| 9,123,117 B2* | 9/2015 | Ciurea .................. | G06T 7/593 |
| 9,123,118 B2* | 9/2015 | Ciurea .................. | G06T 7/593 |
| 9,129,377 B2* | 9/2015 | Ciurea .................. | G06T 7/593 |
| 9,147,254 B2* | 9/2015 | Ciurea .................. | G06T 7/593 |
| 9,224,060 B1* | 12/2015 | Ramaswamy ..... | G06K 9/00912 |
| 9,235,900 B2* | 1/2016 | Ciurea .................. | G06T 7/593 |
| 9,237,263 B2* | 1/2016 | Rime .................. | H04N 5/2254 |
| 9,240,049 B2* | 1/2016 | Ciurea .................. | G06T 7/593 |
| 9,443,130 B2* | 9/2016 | Ukil .................. | G06K 9/00208 |
| 9,460,515 B2 | 10/2016 | Tosic et al. | |
| 9,569,853 B2 | 2/2017 | Tosic et al. | |
| 9,830,698 B2* | 11/2017 | Wang .................. | G06T 7/0012 |
| 2004/0184655 A1 | 9/2004 | Ziegler et al. | |
| 2006/0239336 A1 | 10/2006 | Baraniuk et al. | |
| 2007/0031037 A1* | 2/2007 | Blake .................. | G06K 9/00234 382/173 |
| 2007/0109300 A1* | 5/2007 | Li .......................... | G06T 15/20 345/427 |
| 2008/0219579 A1 | 9/2008 | Aksyuk et al. | |
| 2008/0228446 A1 | 9/2008 | Baraniuk et al. | |
| 2008/0317308 A1* | 12/2008 | Wu .................... | G06K 9/4638 382/128 |
| 2009/0052767 A1 | 2/2009 | Bhalerao et al. | |
| 2010/0265385 A1* | 10/2010 | Knight .................. | H04N 5/232 348/340 |
| 2011/0032337 A1 | 2/2011 | Rodriguez Ramos et al. | |
| 2011/0069189 A1 | 3/2011 | Venkataraman et al. | |
| 2011/0211045 A1* | 9/2011 | Bollano .................. | G06T 15/20 348/46 |
| 2012/0050562 A1 | 3/2012 | Perwass et al. | |
| 2012/0163672 A1 | 6/2012 | McKinnon | |
| 2012/0183202 A1* | 7/2012 | Wei .................... | H04N 13/261 382/154 |
| 2012/0218386 A1 | 8/2012 | Brady | |
| 2012/0314949 A1* | 12/2012 | Grady .................. | G06T 7/11 382/173 |
| 2013/0089151 A1 | 4/2013 | Do et al. | |
| 2013/0128068 A1 | 5/2013 | Georgiev et al. | |
| 2013/0216124 A1 | 8/2013 | Shroff et al. | |
| 2013/0216125 A1 | 8/2013 | Shroff et al. | |
| 2013/0300912 A1 | 11/2013 | Tosic et al. | |
| 2014/0098191 A1* | 4/2014 | Rime .................. | H04N 5/2254 348/46 |
| 2014/0125666 A1* | 5/2014 | Noh .................... | H04N 13/128 345/421 |
| 2014/0206979 A1* | 7/2014 | Berkner .................. | A61B 1/227 600/407 |
| 2014/0232822 A1* | 8/2014 | Venkataraman ....... | H04N 5/225 348/43 |
| 2014/0316238 A1* | 10/2014 | Berkner .............. | G02B 23/243 600/407 |
| 2015/0078669 A1* | 3/2015 | Ukil .................. | G06K 9/00208 382/201 |
| 2015/0091900 A1* | 4/2015 | Yang .................. | G06T 5/006 345/419 |
| 2015/0117756 A1 | 4/2015 | Tosic et al. | |
| 2015/0294472 A1* | 10/2015 | Putraya .................. | G06T 7/0055 382/154 |
| 2016/0267672 A1* | 9/2016 | Ciurea .............. | H04N 13/0022 |
| 2017/0124717 A1* | 5/2017 | Baruch .................. | G06T 7/187 |
| 2017/0249532 A1* | 8/2017 | Okazaki .................. | G06K 9/481 |
| 2017/0316602 A1* | 11/2017 | Smirnov .............. | G06T 15/205 |

OTHER PUBLICATIONS

Babacan, S. D. et al., "Compressive Sensing of Light Fields," in Proceedings of the IEEE International Conference on Image Processing, 2009, pp. 2337-2340.

Candes, E.J. et al., "An Introduction to Compressive Sampling", IEEE Signal Processing Magazine, Mar. 2008, pp. 21-30.

Candes, E. et al., "Ridgelets: A Key to Higher-Dimensional Intermittency?" Philosophical Transactions of the Royal Society of London. Series A: Mathematical, Physical and Engineering Sciences, 1999, pp. 2495-2509, vol. 357, No. 1760.

Candes, E. J. et al., "Stable Signal Recovery from Incomplete and Inaccurate Measurements," Communications on Pure and Applied Mathematics, 2006, pp. 1207-1223, vol. 59, No. 8.

Duarte-Carvajalino, J. et al., "Learning to Sense Sparse Signals: Simultaneous Sensing Matrix and Sparsifying Dictionary Optimization," IEEE Transactions on Image Processing, Jul. 2009, pp. 1395-1408, vol. 18, No. 7.

Elad, M. "Optimized Projections for Compressed Sensing," Signal Processing, IEEE Transactions on, Dec. 2007, pp. 5695-5702, vol. 55, No. 12.

Friedman, J. et al., "A Note on the Group Lasso and a Sparse Group Lasso," Arxiv preprint arXiv, Feb. 11, 2010, pp. 1-8.

Gelman, A. et al., "Layer-Based Sparse Representation of Multiview Images," EURASIP Journal on Advances in Signal Processing, 2012, p. 61, vol. 2012, No. 1.

Gleichman, S. et al., "Blind Compressed Sensing," Information Theory, IEEE Transactions on, Oct. 2011, pp. 6958-6975, vol. 57, No. 10.

Hillar, C. et al., "Deciphering Subsampled Data: Adaptive Compressive Sampling as a Principle of Brain Communication," in Advances in Neural Information Processing Systems 23, Eds: J. Laerty and C. K. I. Williams and J. Shawe-Taylor and R.S. Zemel and A. Culotta, 2011, pp. 910-918.

Hosseini Kamal, M. et al., "Light Field Compressive Sensing in Camera Arrays," in Proceedings of the IEEE International Conference on Acoustics, Speech, and Signal Processing, 2012, 4 pages.

Lankton, S. et al., "Localizing Region-Based Active Contours," IEEE Transactions on Image Processing, Nov. 2008, pp. 2029-2039, vol. 17, No. 11.

Levin, A. et al., "Linear View Synthesis Using a Dimensionality Gap Light Field Prior," 2010 IEEE Conference on Computer Vision and Pattern Recognition (CVPR), 2010, pp. 1831-1838.

(56) References Cited

OTHER PUBLICATIONS

Levoy, M. et al., "Light Field Rendering," Proceedings of the 23rd Annual Conference on Computer Graphics and Interactive Techniques, pp. 31-42, 1996.
Lewicki, M. S. et al., "Probabilistic Framework for the Adaptation and Comparison of Image Codes," J. Opt. Soc. Am. A: Optics, Image Science, and Vision, Jul. 1999, pp. 1587-1601, vol. 16, No. 7.
Ng, R. et al., "Light Field Photography with a Hand-Held Plenoptic Camera," Technical Report CSTR, 2005, pp. 1-11.
Olshausen, B. A. et al., "Emergence of Simple-Cell Receptive Field Properties by Learning a Sparse Code for Natural Images," Nature, Jun. 13, 1996, pp. 607-609, vol. 381, No. 6583, Springer-Verlag New York Inc.
Skretting, K. et al., "Recursive Least Squares Dictionary Learning Algorithm", IEEE Transactions on Signal Processing, Apr. 2010, pp. 2121-2130, vol. 58, No. 4.
Tosic, I. et al., "Dictionary learning," IEEE Signal Processing Magazine, Mar. 2011 pp. 27-38, vol. 28, No. 2.
Tropp, J., "Just Relax: Convex Programming Methods for Identifying Sparse Signals in Noise," IEEE Transactions on Information Theory, Mar. 2006, pp. 1030-1051, vol. 52, No. 3.
Vaish, V. et al., "Using Plane + Parallax for Calibrating Dense Camera Arrays," Proceedings of the 2004 IEEE Computer Society Conference on Computer Vision and Pattern Recognition, CVPR 2004, 2004, pp. 1-8, vol. 1.
Yang, S. et al., "Novel Super Resolution Restoration of Remote Sensing Images Based on Compressive Sensing and Example Patches-Aided Dictionary Learning," in International Workshop on Multi-Platform/Multi-Sensor Remote Sensing and Mapping (M2RSM), 2011, Jan. 2011, pp. 1-6.
Kim, C. et al. "Scene Reconstruction from High Spatio-Angular Resolution Light Fields," Transactions on Graphics (TOG), Jul. 2013, 11 pp., vol. 32, No. 4.
Lindeberg, T.,"Edge Detection and Ridge Detection with Automatic Scale Selection," IEEE Computer Society Conference on in Computer Vision and Pattern Recognition, Proceedings CVPR '96, IEEE 1996, 1996, pp. 465-470.
Lindeberg, T., "Generalized Gaussian Scale-Space Axiomatics Comprising Linear Scale-Space, Affine Scale-Space and Spatio-Temporal Scale-Space," Journal of Mathematical Imaging and Vision, 2011, pp. 36-81, vol. 40, No. 1.
Lindeberg, T., "Scale-Space," Wiley Encyclopedia of Computer Science and Engineering, 2008, 2495-2504, May be retrieved at<URL:http://onlinelibrary.wiley.com/doi/10.1002/9780470050118.ecse60-9/abstract.
Lowe, D. G., "Distinctive Image Features From Scale-Invariant Keypoints," International Journal of Computer Vision, 2004, pp. 91-110, vol. 60, No. 2.
Seitz, S. M. et al., "A Comparison and Evaluation of Multi-View Stereo Reconstruction Algorithms," Proceedings of the 2006 IEEE Computer Society Conference on Computer Vision and Pattern Recognition (CVPR'06), IEEE, 2006, pp. 519-528, vol. 1.
Wanner, S. et al., "Globally Consistent Depth Labeling of 4d light Fields," 2012 IEEE Conference on Computer Vision and Pattern Recognition (CVPR), IEEE, 2012, pp. 41-48.
Witkin, A., "Scale-Space Filtering: A New Approach to Multi-Scale Description," IEEE International Conference on Acoustics, Speech, and Signal Processing, ICASSP'84, IEEE, 1984, pp. 150-153, vol. 9.
European Extended Search Report, European Application No. 14187353.9, dated Oct. 29, 2015, 12 pages.
Feris, R.S., "Detection and Modeling of Depth Discontinuities with Lighting and Viewpoint Variation," PhD Thesis, 2006, pp. 1-165, [Online] [Retrieved on Oct. 21, 2015], May be retrieved at<URL:http://www.cs.ucsb.edu/mturk/pubs/FerisPhD.pdf>.
Gortler, S.J. et al., "The Lumigraph," Computer Graphics Proceedings 1996 (SIGGRAPH), Aug. 7, 1996, pp. 43-54.
Lin, Y. et al., "Occlusion-Aware Layered Scene Recovery from Light Fields," 2013 IEEE International Conference on Image Processing, Sep. 15, 2013, pp. 295-299.
Lindeberg, T. et al., "Feature Detection with Automatic Scale Selection," International Journal of Computer Vision, Nov. 1998, pp. 79-116, vol. 30, No. 2.
Tosic, I. et al., "Light Field Scale depth Space Transform for Dense Depth Estimation," 2014 IEEE Conference on Computer Vision and Pattern Recognition Workshops, IEEE, Jun. 23, 2014, pp. 441-448.
Tosic, I. et al., "3D Keypoint Detection by Light Field Scale-Depth Space Analysis," 2014 IEEE International Conference on Image Processing (ICIP), Oct. 2014, pp. 1927-1931.
Chan, T.F. et al., "Active Contours Without Edges for Vector-Valued Images," Journal of Visual Communication and Image Representation, 2000, pp. 130-141, vol. 11.
Achanta, R. et al., "SLIC Superpixels Compared to State-of-the-Art Superpixel Methods," IEEE Transactions on Pattern Analysis and Machine Intelligence, Nov. 2012, pp. 2274-2282, vol. 34, No. 11.

\* cited by examiner

OBJECT SEGMENTATION FROM LIGHT FIELD DATA

CROSS-REFERENCE TO RELATED APPLICATION(S)

This application claims priority under 35 U.S.C. § 119(e) to U.S. Provisional Patent Application Ser. No. 62/304,507, "Object Segmentation from Light Field Data," filed Mar. 7, 2016. The subject matter of all of the foregoing is incorporated herein by reference in its entirety.

BACKGROUND

1. Technical Field

The technical field of this disclosure relates generally to segmenting objects from light field data, for example as obtained by plenoptic cameras or camera arrays.

2. Description of the Related Art

Object segmentation from light field images has not been studied much in the past. A few approaches perform analysis of epipolar plane images to separate them into layers, where each layer is a collection of pixels corresponding to scene features present at a certain depth plane. In some approaches, the segmentation is based on the assumption that each layer in the light field corresponds to a three-dimensional (3D) plane placed fronto-parallel to the camera, i.e., at a constant depth. Researchers have also introduced the concept of occlusions by using masking function for visible and non-visible regions of the image. In one approach, the segmentation is based on active contours using the level-set method. In another approach, the layers are separated by modeling the light field as a non-linear combination of layers represented by a sparse decomposition. However, the assumption of constant depth across a layer would be violated in most real-world scenes.

An approach not restricted to planar depth layers introduces a variational labeling framework on ray space. The segmentation is defined as an energy minimization using regularization in the epipolar plane images, to encourage smoothing in the direction of rays present in epipolar plane images and in the spatial domain (enforce the label transition costs). Other approaches use oriented windows and the simple linear interactive clustering (SLIC) super pixel segmentation method to perform segmentation.

However, all of these approaches have drawbacks.

SUMMARY

The present disclosure segments a scene into objects based on light field data for the scene, including based on image pixel values (e.g., intensity, color) and disparity map(s).

In one aspect, light field data for a scene includes a plurality of images of the scene taken from different viewpoints. The light field data is used to estimate one or more disparity maps for the scene taken from different viewpoints. The scene is then segmented into a plurality of regions that correspond to objects in the scene. Unlike other approaches, the regions can be of variable depth. That is, the objects are not assumed to be at a constant depth. In one approach, the regions are defined by boundaries. The boundaries are determined by varying the boundary to optimize an objective function for the region defined by the boundary. The objective function is based in part on a similarity function that measures a similarity of image pixel values for pixels within the boundary. The objective function may also measure a similarity of disparities for pixels within the boundary.

In other variations, the objective function may also be based in part on a second similarity function that measures a similarity of image pixel values for pixels outside the boundary and/or also measures a similarity of disparities for pixels outside the boundary. The objective function may also be based in part on a factor that measures a length of the boundary. One example of a similarity function is based on a descriptor function that is evaluated at a pixel compared to an average value of the descriptor function taken over all pixels within the boundary. Specific examples of descriptor functions are based on the mean or variance of pixel image values along epipolar lines in the light field data, or on derivatives of the pixel image values and/or derivatives of the disparities. In another aspect, the boundary is optimized by initializing the boundary and then evolving the boundary based on an active contour framework.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Epipolar Plane Images

Figure 1:
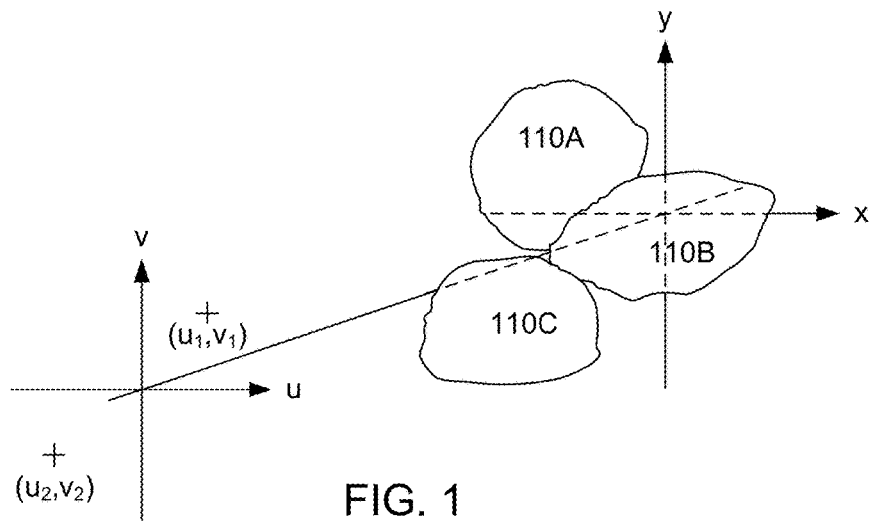
FIG. 1 is a diagram illustrating a three-dimensional scene.

FIG. 1 is a diagram illustrating a simplified three-dimensional scene with three objects 110A-C. We express the light field from the scene as radiance at any point in space in any given direction. The light field can be parameterized as a four-dimensional function that represents the radiance of a light ray coming from a point source at the location (x, y), as observed at a location (u, v) on a given reference surface. FIG. 1 shows a reference (x,y) plane and a reference (u,v) plane. Two points $(u_1, v_1)$ and $(u_2, v_2)$ are shown in the (u,v) plane, which can be thought of as a viewpoint plane, and the coordinates (u,v) define a space that will be referred to as the (view) domain.

We denote the light field as I(x, y, u, v). The light field image $I(x, y, u_1, v_1)$ is the image of the scene as taken from the viewpoint $(u_1, v_1)$. It can be thought of as the image that would be captured by a pinhole camera where the pinhole is located at position $(u_1, v_1)$. Similarly, the light field image $I(x, y, u_2, v_2)$ is the image of the scene as taken from the viewpoint $(u_2, v_2)$. In FIG. 1, the (x,y) plane is drawn in object space but it is more appropriately thought of as a universal coordinate system defined in image space. It is universal in the sense that all light field images are defined relative to a common (x,y) coordinate system. The coordinates (x,y) define a space that will be referred to as the (image) domain.

Thus, the light field I(x, y, u, v) may sometimes be referred to as an (image,view) domain representation of the three-dimensional scene, because it is a representation of the three-dimensional scene from the (image) and (view) domains. Devices may be used to capture this type of light field data. For example, plenoptic cameras, camera arrays or other types of multi-view imaging devices may be used to capture images of the three-dimensional scene taken from different viewpoints. Mathematically, these devices sample the light field I(x, y, u, v) at different values of (u,v). The set of images may also be referred to as multi-view images of the three-dimensional scene.

Figure 2A:
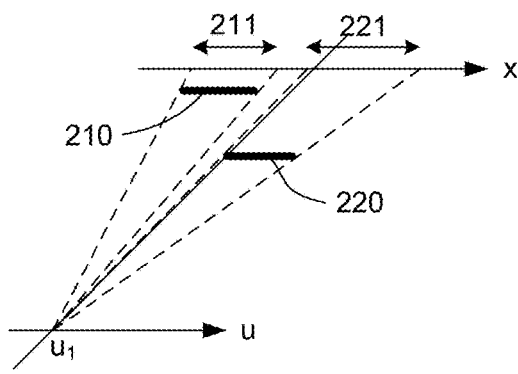
FIGS. 2A-2C are diagrams illustrating two objects viewed from three different viewpoints.

If we look at some examples of two-dimensional slices I(x,u) of light field data, as shown in FIGS. 2A-2D, we can see a line structure inherent to the characteristics of light field data with uniformly spaced viewpoints, where the angle of the line in the (x,u) domain corresponds to different depths in the scene. FIG. 2A shows two objects 210 and 220 which are at different depths. Object 220 is forward of object 210. It may or may not occlude object 210, depending on the viewpoint u.

FIG. 2A is taken from viewpoint $u_1$. From this viewpoint, object 210 occupies the x interval 211 and object 220 occupies the x interval 221. The two intervals 211 and 221 do not overlap and there is no occlusion. FIG. 2D shows a two-dimensional (x,u) slice of the light field data for these two objects. These slices which use both (image) coordinates and (view) coordinates will be referred to as epipolar slices or epipolar plane images. The x-slice of FIG. 2A is marked by $u_1$ on the vertical u axis. The two intervals 211 and 221 are reproduced as the two line segments at coordinate $u=u_1$ in FIG. 2D.

Figure 2B:
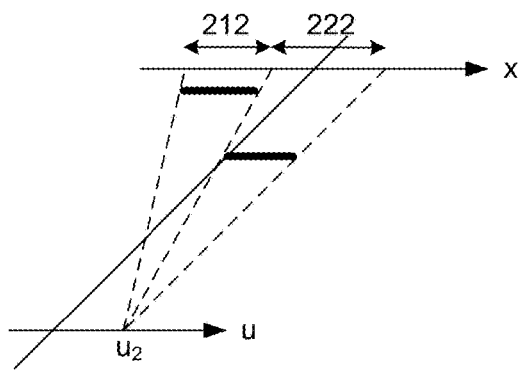

FIG. 2B shows the same two objects from a different viewpoint $u_2$. From this viewpoint, object 210 occupies the x interval 212 and object 220 occupies the x interval 222. This is also shown by the two line segments at coordinate $u=u_2$ in FIG. 2D. Note that there is a shift of these segments with respect to the segments at coordinate $u=u_1$. This relative shift due to viewpoint change is called the parallax. In FIG. 2B, the two x intervals 212 and 222 are just touching.

Figure 2C:
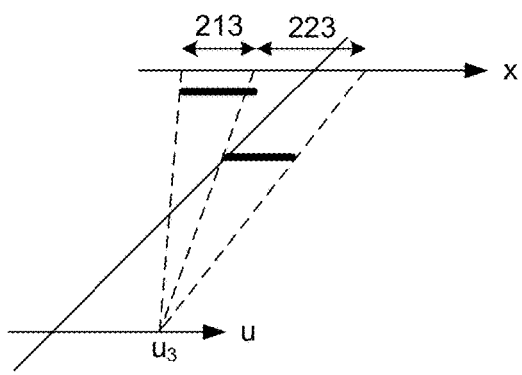
Figure 2D:
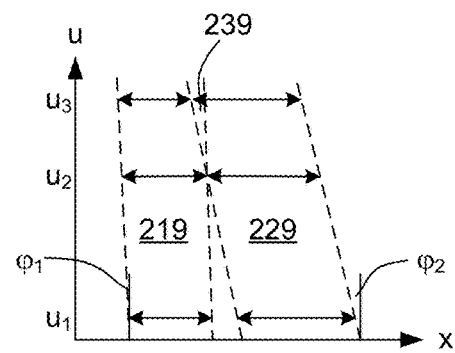
FIG. 2D is a diagram illustrating an (x,u) slice of the corresponding light field data.

FIG. 2C shows the two objects from viewpoint $u_3$. Here, object 210 occupies the x interval 213 and object 220 occupies the x interval 223, as also shown by the two line segments at $u=u_3$ in FIG. 2D. The two x intervals 213 and 223 are overlapping, which means that object 220 occludes part of object 210. The occluded region is the area of overlap. Repeating this process for other viewpoints u results in the two trapezoids 219 and 229 shown in FIG. 2D, which will be referred to as rays or epipolar rays. The area of overlap 239 represents the occlusion of object 210 by object 220. Since object 220 is forward of object 210, epipolar ray 229 will be unaffected by the overlap region 239. That is, the edges of epipolar ray 229 will continue to be parallel. In contrast, epipolar ray 219 will be minus the triangular overlap region 239.

We see an inherent line structure in the epipolar plane image of FIG. 2D. That is, each point in an object creates an epipolar line in the (x,u) plane at an angle φ with respect to the normal to the x axis. A set of adjacent points at the same depth creates an epipolar ray of a certain width, which forms an angle φ with the vertical axis. These angles are labeled $φ_1$ and $φ_2$ in FIG. 2D. In the general four-dimensional case, these angles would be with respect to the normal to the (x,y) plane. For convenience, the angle φ will be referred to as the parallax angle. The parallax angle φ depends on the depth location of the object. Due to parallax, objects that are farther in depth from the viewpoint u-plane produce lines with a smaller parallax angle φ. Epipolar ray 219, which corresponds to object 213 which is farther from the u axis has a lower parallax angle φ. Epipolar ray 229, which corresponds to object 223 which is closer to the u axis, has a larger parallax angle φ. In some configurations of camera arrays or plenoptic cameras, the angle φ can also be negative. These rays correspond to objects that are located further along the direction towards the viewpoint, than objects that produce vertical epipolar rays (i.e., rays with φ=0). Generally, the angle φ can take values within the interval $(-π/2, π/2)$.

Figure 3A:
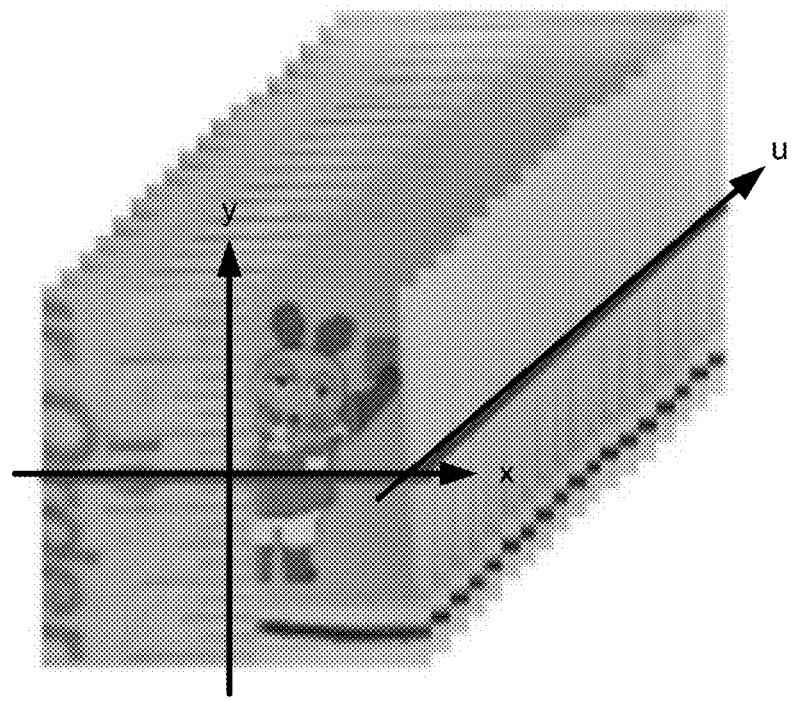
FIG. 3A is a diagram of light field data with multiple images of a scene taken from different viewpoints.
Figure 3B:
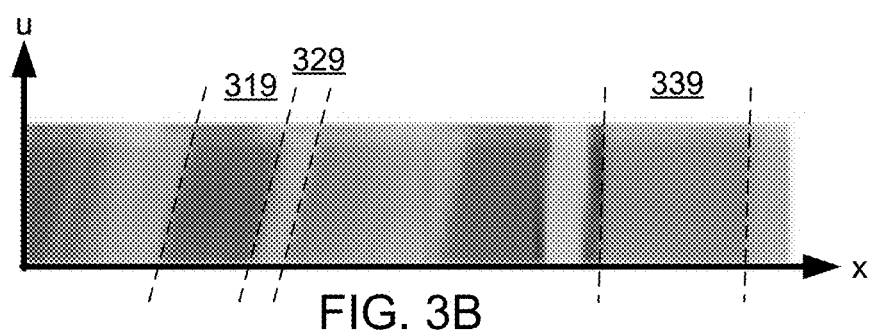
FIG. 3B is an epipolar slice of the light field data of FIG. 3A.

FIG. 3A is a diagram of light field data with multiple images of a scene taken from different viewpoints. In this scene, there is a ruler in the foreground and a cartoon mouse in the background. In FIG. 3A, the (x,y) images are arranged in a stack, with each image in the stack taken at a different viewpoint (u). For purposes of clarity, the second viewpoint coordinate (v) is not shown. FIG. 3B is an epipolar slice of the light field data of FIG. 3A. The inherent line structure can be clearly seen. For convenience, rays 319, 329, 339 are marked in FIG. 3B to highlight the ray structure. The parallax angle for rays 319, 329 is larger than the parallax angle for ray 339. This is because rays 319, 329 are for the ruler which is in the foreground of the scene, whereas rays 339 are for the cartoon background which is in the background of the scene. There is a direct correspondence between parallax angle φ and depth in the three-dimensional scene. As a result, the ray structure in the epipolar (x,u) representation of the light field data can be used to estimate depth in the three-dimensional scene.

Object Segmentation

Figure 4:
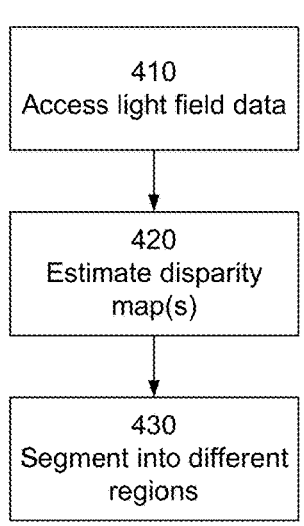
FIG. 4 is a flow diagram of a method for segmenting a scene into objects, according to one embodiment.

FIG. 4 is a flow diagram of a method for segmenting a scene into objects, according to one embodiment. The general goal for object segmentation is to divide the scene into separate regions, where the regions correspond to different objects in the scene. According to a general segmentation framework, we can consider the problem as partitioning m-dimensional data $D \in R^m$ into regions L and $\overline{L}$ separated by a boundary $\Gamma(\sigma)$ with $\sigma \in R^{m-1}$. Our goal is to segment the light field data into N regions $\{L_1, \ldots, L_N\}$ separated by boundaries $\{\Gamma_1, \ldots, \Gamma_N\}$. In the formulation below, the regions can be variable-depth. That is, the regions do not have to be at a constant depth in the scene, unlike many other approaches to object segmentation.

In FIG. 4, the object segmentation is based on accessing 410 light field data for the scene. As described above, light field data includes multiple images of the scene taken from different viewpoints. Because of the different viewpoints present in the light field data, the data can be used to estimate 420 one or more disparity maps (aka, depth maps) for the scene. The scene is then segmented 430 into different regions, as follows.

We can formulate the segmentation problem using an optimization framework where the boundary for a region is obtained by minimizing an objective function J given by $$\Gamma^* = \arg\min_\Gamma J(\Gamma). \quad (1)$$

Using a region-based cost function, in one embodiment, the equation (1) can be defined as:

$$J(\Gamma) = \int_L S(x,L)dx + \int_{\overline{L}} S(x,\overline{L})dx + \int_\Gamma \eta d\sigma \quad (2)$$

where L and $\overline{L}$ are the regions defined by pixels within the boundary $\Gamma$ and outside the boundary $\Gamma$ respectively, x are the (image) coordinates such as (x,y), and the similarity function S(•) measures the homogeneity or similarity of pixels within each region. The similarity function S(x,L) preferably is selected so that it tends to zero when x belongs to the region L. For object segmentation, we formulate the similarity function S(•) to take into account both image pixel values (e.g., intensity) and disparity (depth). The first term in equation (2) measures the similarity of pixels within the boundary $\Gamma$, and the second term measures the similarity of pixels outside the boundary $\Gamma$. The last term $\eta$ is a regularization parameter to reduce the length of the boundary $\Gamma$. The segmentation problem described above can be solved using an active contour framework, where the boundary $\Gamma$ is determined by optimizing the objective function J in an iterative fashion. It should be understood that equation (2) is just one example of an objective function.

Different types of similarity functions S(•) can also be used. In one approach, the similarity function S(•) takes the form $$S(x, L) = \left[ D(x, p_x) - \frac{1}{|L|} \sum_{x \in L} D(x, p_x) \right]^2 \quad (3)$$

In this equation, we use the following notation. Let $I_{i,j}(x) = I(x, y, u_i, v_j)$ denote the image of the scene taken from a viewpoint $(u_i, v_j)$, $i=1, \ldots, N_u$; $j=1, \ldots, N_v$, where $N_u$ and $N_v$ denote the total number of views in u and v direction, respectively. With a slight abuse of notation, x here denotes a pixel (x, y) in the image. Similarly, we define $P_{i,j}(x)$ as the two-dimensional disparity (or depth) map for a viewpoint $(u_i, v_j)$. It is often convenient to choose a reference view, with respect to which we calculate the image pixel and disparity values. Without loss of generality, we choose the central view as the reference view, but any other view can be used as well. To simplify notation, we denote the image pixel values and depth values for the central view as I(x) and $P(x) \equiv p_x$, respectively. In equation (3), D(x, $p_x$) is a descriptor function that depends on the pixel x and its disparity $p_x$. In the second term of equation (3), |L| denotes the cardinality of region L (e.g., the number of pixels in the region). Thus, the second term represents the average value of the descriptor function D(x, $p_x$) where the average is taken over the region L. The similarity function S(•) is then the variance of D(x, $p_x$) over the region L. Now consider two different examples of descriptors D(x, $p_x$).

Descriptor Example 1: Based on the Mean of Pixels Along Epipolar Rays

Based on the inherent structure of the light field data where pixels along epipolar lines is constant, we define a descriptor d(.) as $$d(x, p_x) = \mu(x, p_x) \quad (4A)$$

where $\mu(x, p_x)$ is the mean value for all pixels along the epipolar line (ray) that passes through the pixel x with an associated disparity $p_x$. Note that in equation (4A), the disparity (depth) may be different for different pixels in a region. This allows us to remove any assumption of constant depth across a region and thus allows segmentation into objects that are not fronto-parallel to the camera.

Descriptor Example 2: Based on the Variance of Pixels Along Epipolar Rays

Alternately, we define another descriptor d(.) as $$d(x, p_x) = [I(x) - \mu(x, p_x)]^2 \quad (4B)$$

This descriptor represents the variance of pixel values along the epipolar line (ray) that passes through the pixel x with an associated disparity $p_x$. As for descriptor 1, the disparity (depth) may be different for different pixels in a region.

In one approach, the descriptor of equations (4A) or (4B) is calculated for both horizontal and vertical viewpoints, yielding two quantities $d_H(x, p_x)$ and $d_V(x, p_x)$. These are then combined, for example by a weighted sum, to yield the descriptor function D(x, $p_x$) used in equation (3). A similar approach can be used with different color channels, where the descriptor of equations (4A) or (4B) is calculated for different color channels and then combined by summing the corresponding similarity functions (equation 3) for the color channels to give an overall similarity function.

Figure 5:
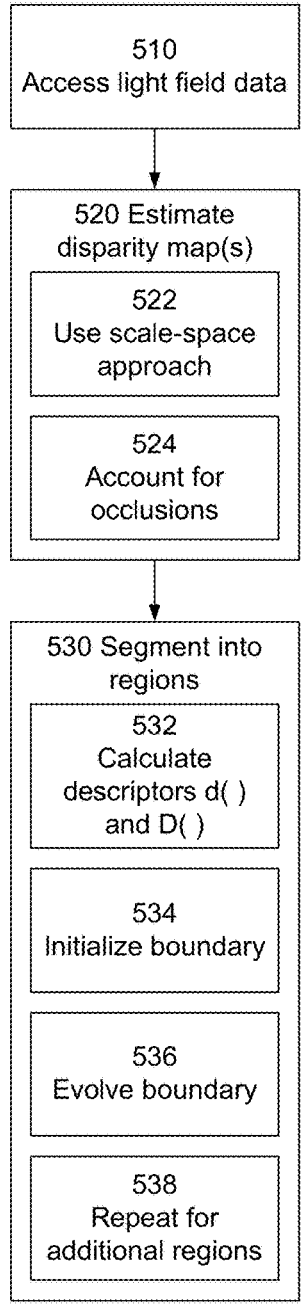
FIG. 5 is a flow diagram of a method for segmenting a scene into objects, according to another embodiment.

FIG. 5 is a flow diagram of one embodiment of a method for segmenting a scene into objects, using the descriptor of equations (4A) or (4B). The object segmentation is based on accessing 510 light field data that includes multiple images of the scene taken from different viewpoints. The light field data is used to estimate 520 one or more disparity maps. In this example, estimation of the disparity maps is based on using a scale-space approach 522 where each of the epipolar plane images is convolved with a filter bank of Ray-Gaussians, as further described below and in U.S. patent application Ser. No. 15/048,742, "Processing of Light Fields by Transforming to Scale and Depth Space" and Section II of U.S. Provisional Appl. No. 62/304,507, "Object Segmentation from Light Field Data," both of which are incorporated herein by reference in their entirety. Optionally, occlusions are taken into account 524 based on the overlap of rays in epipolar space, as described previously in FIG. 2D. For example, only nonoverlapping rays are retained, with their associated disparities.

Segmentation 530 is implemented using the descriptor d(x, $p_x$) of equations (4A) or (4B). The descriptors for pixels associated with the nonoverlapping rays is computed 532, both for horizontal ($d_H(x, p_x)$) and vertical ($d_V(x, p_x)$) views in the light field. The descriptors $d_H$ and $d_V$ from horizontal and vertical views are combined 532 to obtain an overall descriptor function D( ) (for example by a weighted sum of $d_H$ and $d_V$). This is then used as the basis for the similarity function S(x,L) of equation (3) and objective function J(Γ) of equation (2). An initial boundary Γ is given as input and the similarity function is initialized 534 on this initial boundary and the boundary is evolved 536 based on the active contour framework until the change in the objective function J(Γ) is below a predefined threshold. For further details on evolving a boundary based on the active contour framework, see Section III of U.S. Provisional Appl. No. 62/304,507, "Object Segmentation from Light Field Data," which is incorporated herein by reference in its entirety. In case of segmenting into multiple regions, the process can be repeated 538 iteratively for subsequent regions.

Descriptor Example 3: Based on Image and Depth

As yet another alternative, we can define a descriptor as a combination of terms based on image and depth:

$$d(x, p_x) = w_I I(x) + w_P P(x), \quad (5A)$$

where $w_I$ and $w_P$ are weights for combining the two terms. They can be chosen for example to normalize the image and depth data accordingly, or to give more weight to one of the two components.

Descriptor Example 4: Based on Image and Depth Derivatives

We can define another descriptor as a combination of image and depth derivatives:

$$d(x, p_x) = w_I \|\nabla I(x)\| + w_P \|\nabla P(x)\| \quad (5B)$$

where $w_I$ and $w_P$ are weights for combining the two derivatives, and the derivative refers to the spatial derivative over x, and $\|.\|$ denotes the magnitude.

For the descriptor of equations (5A) or (5B), we can combine disparity estimates from horizontal views and vertical views into a combined disparity map P(x), which would then be used for calculating d( ) in equations (5A) or (5B), respectively, and d( ) is then used directly as the description function D( ) in the similarity function. Descriptors based on equations (5A) or (5B) can also be calculated for different color channels and then combined by summing the corresponding similarity functions (equation 3) for the color channels to give the overall similarity function.

Figure 6:
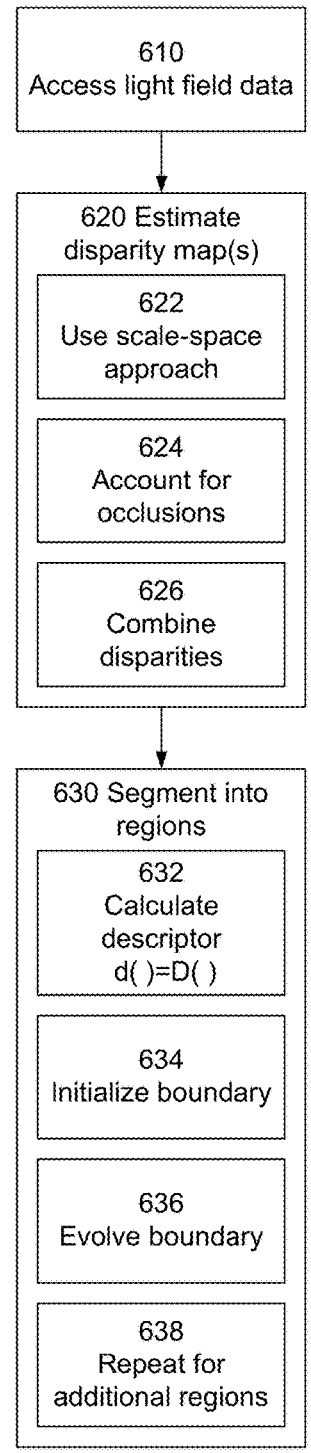
FIG. 6 is a flow diagram of a method for segmenting a scene into objects, according to yet another embodiment.

FIG. 6 is a flow diagram of one embodiment of a method for segmenting a scene into objects, using the descriptor of equations (5A) or (5B). The object segmentation is based on accessing 610 light field data that includes multiple images of the scene taken from different viewpoints. The light field data is used to estimate 620 one or more disparity maps. In this example, estimation of the disparity maps is based on using a scale-space approach 622 where each of the epipolar plane images is convolved with a filter bank of Ray-Gaussians, as further described below and in U.S. patent application Ser. No. 15/048,742, "Processing of Light Fields by Transforming to Scale and Depth Space" and Section II of U.S. Provisional Appl. No. 62/304,507, "Object Segmentation from Light Field Data," both of which are incorporated herein by reference in their entirety. In addition, occlusions are taken into account 624 based on the overlap of rays in epipolar space, as described previously in FIG. 2D. Disparity maps may be calculated for horizontal and vertical views and then combined 626 into an overall disparity.

Segmentation 630 is implemented using the descriptor $d(x, p_x)$ of equations (5A) or (5B), which is used directly 632 as the descriptor function D( ). This is then used as the basis for the similarity function S(x,L) of equation (3) and objective function J(Γ) of equation (2). A boundary Γ is initialized 634 and evolved 636 based on the active contour framework until the change in the objective function J(Γ) is below a predefined threshold. For further details on evolving a boundary based on the active contour framework, see Section III of U.S. Provisional Appl. No. 62/304,507, "Object Segmentation from Light Field Data," which is incorporated herein by reference in its entirety. In case of segmenting into multiple regions, the process can be repeated 638 iteratively for subsequent regions.

Example with Tympanic Membrane.

Figure 7:
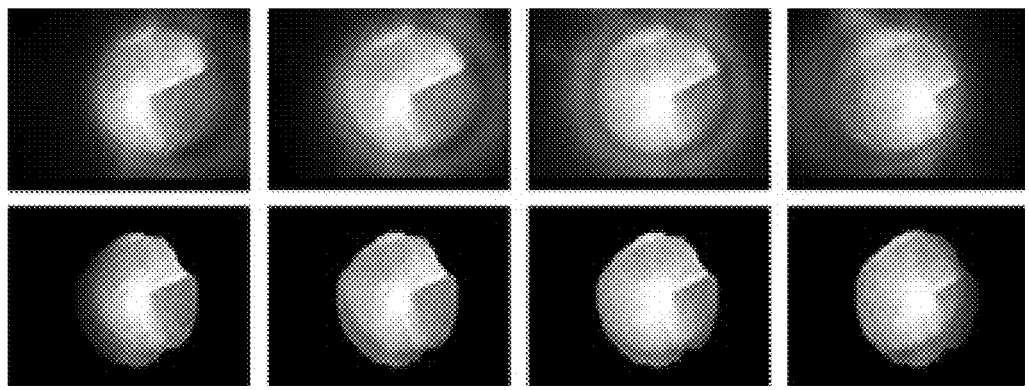
FIG. 7 are grayscale images illustrating object segmentation of light field data for a tympanic membrane, according to one embodiment.

FIG. 7 are grayscale images illustrating object segmentation of light field data for a tympanic membrane. The goal is to separate the tympanic membrane and the ear canal in the image. We show results using a light field otoscope with a plenoptic sensor and a standard machine vision lens. In this example, we use the approach based on descriptor example 2. This otoscope type has a characteristic of having a disposable speculum without any lenses in the speculum tip. Therefore, there is visible occlusion of the tympanic membrane (TM) when changing from one viewpoint to another.

The speculum size of 5 mm corresponds to roughly 92 pixels in radius. The initial circular contour is placed in the center of the image and evolved according to the approach described above. The segmentation results on the tympanic membrane data set are shown in FIG. 7. The top row shows the input images from different views in the light field data and the bottom row corresponds to the respective segmentation results. In this case, the light field data is segmented into two regions: one region corresponds to the object of interest which is the tympanic membrane and the other region corresponds to background objects which are mostly the ear canal. In the bottom row of FIG. 7, the background region is covered by a black mask, which shows the boundary between the two regions.

Estimating Disparity

One of the steps in FIGS. 4-6 is estimating disparity from light field data. This can be done using different approaches. In one approach, the disparity is obtained by estimating the parallax angles of lines (rays) in the epipolar plane images. This can be achieved by using a scale-space approach where the epipolar plane images are convolved with a filter bank of Ray-Gaussian kernels. The parallax angles are obtained by finding the extrema in the scale space of the Ray-Gaussians. The different rays are then sorted based on their parallax angle starting with the foreground rays (larger parallax angle) to the background rays (smaller parallax angle). This ordering facilitates in identifying the overlapping rays resulting from occlusion. In the segmentation schemes described above, we use only the rays that are retained after discarding the overlapping rays. FIGS. 7-10 provide additional details.

In the approach described below, instead of processing the light field data directly in the (image,view) domain, the light field images are transformed from the (image,view) domain to an (image,scale,depth) domain. Processing then occurs in that domain instead. The transformation will be referred to as a scale-depth transform. Each of the (scale) and (depth) domains, including the transform to the (image,scale,depth) domain, is described in more detail below. For clarity, the explanations below use one-dimensional "images," but the extension to two dimensions is straightforward. The (image), (view), (scale), and (depth) dimensions are represented by the coordinates x, u, σ and φ, respectively.

Referring to FIG. 2D, the width of each ray 219,229 corresponds to the spatial extent (i.e., size) of the corresponding object 210,220 in the three-dimensional scene. Objects of different sizes can be handled by using a scale space representation of the scene.

In one approach, the scale space representation of an image is obtained by convolving it with a kernel, whose scale changes from small scales (giving a narrow and sharp kernel) to large scales (giving a wide and smooth kernel). At different levels of the scale space, image features of different sizes will be smoothed differently, i.e., small features will disappear at larger scales. Therefore, the scale-space framework allows scale invariant image processing, which is useful for dealing with the object size variations in images, for example due to object pose or camera orientation and distance.

A commonly used kernel for constructing a scale space is the Gaussian kernel. A Gaussian scale space in the one-dimensional case (ignoring the viewpoint u for now) is defined as:

$$I(x, \sigma) = I(x) * G_\sigma(x) \tag{6}$$

where $$G_\sigma(x) = \frac{1}{\sigma\sqrt{2\pi}} e^{-\frac{x^2}{2\sigma^2}}, \tag{7}$$

σ is the (scale) coordinate, and * denotes the convolution operator.

Scale spaces based on the derivatives of the Gaussian kernel can also be constructed. For example, the normalized first derivative of the Gaussian scale-space:

$$I'(x, \sigma) = I(x) * \sigma \frac{dG_\sigma(x)}{dx} \tag{8}$$

can be used for edge-detection, where "normalized" refers to the multiplication by σ. Namely, when a given signal $I(x)=t(x-x_0)$ where $t(x)$ is a step function, we have:

$$I(x) * \frac{dG_\sigma(x)}{dx} = \frac{dI(x)}{dx} * G_\sigma(x) = \delta(x-x_0) * G_\sigma(x) = G_\sigma(x-x_0). \tag{9}$$

The normalized second derivative of the Gaussian scale-space:

$$I''(x, \sigma) = I(x) * \sigma^2 \frac{d^2 G_\sigma(x)}{dx^2} \tag{10}$$

can be used for blob detection, where "normalized" refers to the multiplication by $\sigma^2$. This is because when $I(x)=t(x-x_0)-t(x-x_1)$, we have that $$I(x) * \sigma^2 \frac{d^2 G_\sigma(x)}{dx^2}$$

has a minimum for $$\sigma = \frac{x_0 - x_1}{2}..$$

Figure 8A:
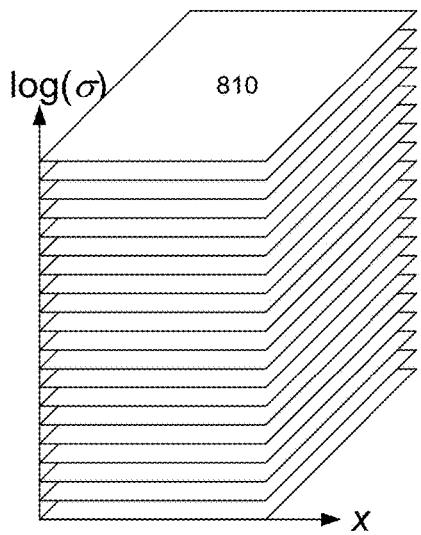
FIG. 8A is a diagram illustrating an example of a Gaussian scale space for a two-dimensional image.
Figure 8B:
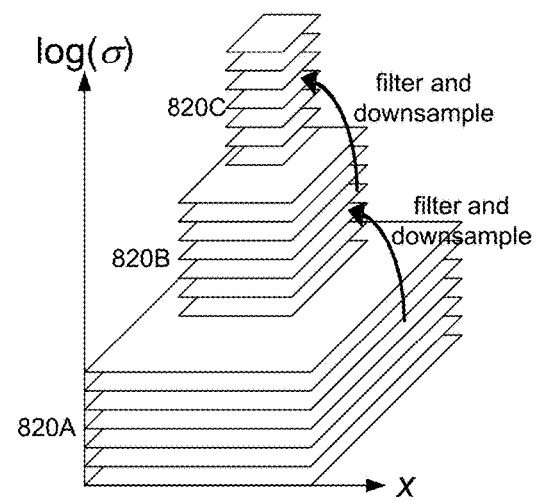
FIG. 8B is a diagram illustrating an example of a Gaussian pyramid.

One advantage of Gaussian scale spaces is that they allow recursive scale domain implementation via a Gaussian pyramid, as shown in FIGS. 8A-8B. In FIG. 8A, element 810 represents a Gaussian scale space. The (x,y) coordinates are the image coordinates and σ is the scale coordinate. For clarity, assume scaling in only one dimension. Element 810 represents equation (6), with log(σ) along the vertical axis. One way to construct element 810 is to directly calculate equation (6) for different values of σ, as represented by the different "slices" in element 810.

An alternate approach is to build a Gaussian pyramid, as shown in FIG. 8B. In this case, element 820A is constructed by directly calculating equation (6). Element 820B is obtained by downsampling the element 820A by a multiplicative factor, for example a factor of 2 (one octave). That is, the slices of element 820B are evaluated at values of σ that are multiples of those used for element 820A, for example multiple of 2. The slices of element 820B can be constructed by filtering and downsampling the slices of element 820A, rather than calculating them by direct application of equation (6). Similarly, the slices in element 820C can be constructed by filtering and downsampling the slices of element 820B.

Now consider a specific example of transforming from the (image,view) domain to the (image,scale,depth) domain, based on the above specifics. In this example, the captured multi-view images are represented in the (image,view) domain by I(x,u). We want to transform the (image,view) domain representation I(x,u) to an (image,scale,depth) domain representation $\mathcal{L}$ (x; σ, φ). For convenience, $\mathcal{L}$ (x; σ, φ) may also be referred to as a scale-depth transform (or scale-depth space) of I(x,u).

Let us first define a kernel that we will use in the transformation. We define the Ray-Gaussian kernel as:

$$\mathcal{R}_{\sigma,\varphi}(x, u) = \frac{1}{\sigma\sqrt{2\pi}} e^{-\frac{(x+u\tan\varphi)^2}{2\sigma^2}}, \tag{11}$$

where x and u are as defined previously, φ is the angle that the Ray-Gaussian kernel forms with the u-axis (i.e., angle with the normal to the x-axis) and σ is the width parameter of the kernel. The "Ray" in Ray-Gaussian refers to the rays that are present in (x,u) space.

Figure 9:
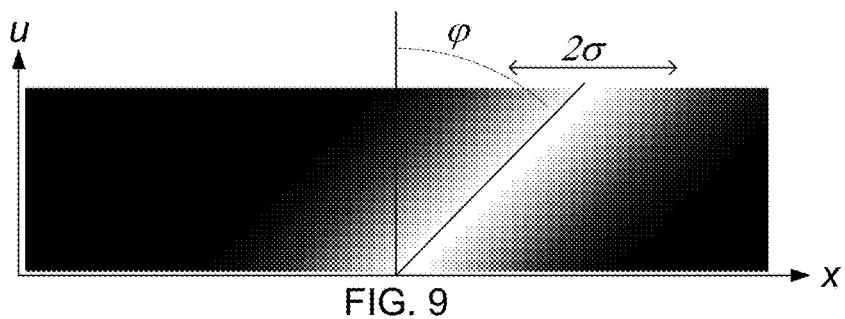
FIG. 9 shows an example of a Ray-Gaussian kernel with $\varphi=\pi/4$ and $\sigma=6$.

FIG. 9 shows an example of a Ray-Gaussian function with φ=π/4 and σ=6. In this grayscale picture, the lighter pixels are higher values and the darker pixels are lower values. The Ray-Gaussian is Gaussian in the x-direction and a ridge in the u-direction. The slant of the ridge is equal to tan φ, which multiplies u in the shift of x in the exponent. This linear shift $x_0=u \tan \varphi$ is chosen here to best represent the ray structures in the (image,view) domain for light fields obtained with the uniform spacing of viewpoints on a flat plane.

Note, however, that one can also choose different (and possibly nonlinear) parameterizations of shift $x_0=f(u)$ to represent different structures such as curved rays. The appropriate choice of $f(u)$ depends on the geometry of the light field image acquisition. In the current examples, each point in the three-dimensional scene creates a line in the (image, view) slice, and points at different depths correspond to lines at different angles. However, if the multi-view images are captured by non-uniform camera arrays on non-flat planes or plenoptic cameras with non-uniform microlens array density, then points at different depths in the three-dimensional scene may correspond to different curves in the (image, view) slice. The function $f(u)$ is chosen accordingly.

We use the Ray-Gaussian kernel to construct the Ray-Gaussian transform $\mathcal{L}(x; \sigma, \varphi)$ of $I(x,u)$ according to:

$$\mathcal{L}(x;\sigma,\varphi)=(I*\mathcal{R}_{\sigma,\varphi})(x,u)|_{u=0} \quad (12)$$

where u=0 is chosen because we are evaluating convolution only over x (image domain). That is, $$(f*g)(x,u)|_{u=0}=\int_x \int_u f(x-x',-u')g(x',u')dx'du' \quad (13)$$

Note here that $\mathcal{L}(x; \sigma, \varphi)$ does not depend on u since the convolution is only over x, and that $\mathcal{L}(x; \sigma, \varphi)$ has both scale $\sigma$ and angle $\varphi$ as parameters.

Similarly, we define the n-th derivative of the Ray-Gaussian transform as:

$$\frac{d^n}{dx^n}\mathcal{L}(x;\sigma,\varphi) = \left(I * \frac{d^n}{dx^n}\mathcal{R}_{\sigma,\varphi}\right)(x,u)\bigg|_{u=0} \quad (14)$$

In the following, we show certain properties of the Ray-Gaussian function, which are beneficial for building the Ray-Gaussian transform. The next two Lemmas prove equalities related to scale change of the Ray-Gaussian and its downsampling or upsampling factor.

Lemma 1: The following equality holds:

$$\mathcal{R}_{\sigma,\varphi}(x,u)=s\mathcal{R}_{s\sigma,\varphi}(sx,su) \quad (15)$$

where s>0 is a scale factor.

Lemma 2: The following equality holds:

$$\mathcal{R}_{\sigma,\varphi}(x,u)=s\mathcal{R}_{s\sigma,\varphi'}(sx,u), \quad (16)$$

where $\varphi'=\arctan(s \tan \varphi)$, $\varphi\in(-\pi/2, \pi/2)$ and s>0.

The second Lemma shows that a Ray Gaussian with scale $\sigma$ and angle $\varphi$ is equal to its downsampled version at scale $s\sigma$ and angle $\varphi'=\arctan(s \tan \varphi)$, with values multiplied by s, for a downsampling only in x by factor s.

Equipped with these two Lemmas, we can now show the following properties of the Ray-Gaussian transform $I*\mathcal{R}_{\sigma,\varphi}$. The next six propositions are related to the behavior of the Ray-Gaussian transform with downsampling of the light field I.

Proposition 1: If we have a light field slice J(x,u) such that J(x,u)=I(sx, su) (i.e., I is a downsampled or upsampled version of J), then:

$$(J*\mathcal{R}_{\sigma,\varphi})(x,u)\bigg|_{u=0} = \frac{1}{s}(I*\mathcal{R}_{s\sigma,\varphi})(sx, su)\bigg|_{su=0} \quad (17)$$

Proposition 2: If we have a light field slice J(x,u) such that J(x,u)=I(sx, u) (i.e., I is a downsampled or upsampled version of J only over x), then:

$$(J*\mathcal{R}_{\sigma,\varphi})(x,u)|_{u=0}=(I*\mathcal{R}_{s\sigma,\varphi'})(sx,u)|_{u=0} \quad (18)$$

where $\varphi'=\arctan(s \tan \varphi)$, $\varphi\in(-\pi/2, \pi/2)$ and s>0.

Figure 10D:
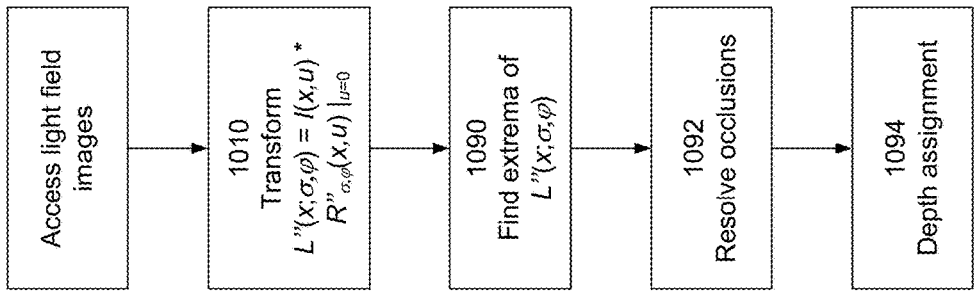
FIG. 10D is a flow diagram illustrating disparity estimation, according to one embodiment.
Figure 10C:
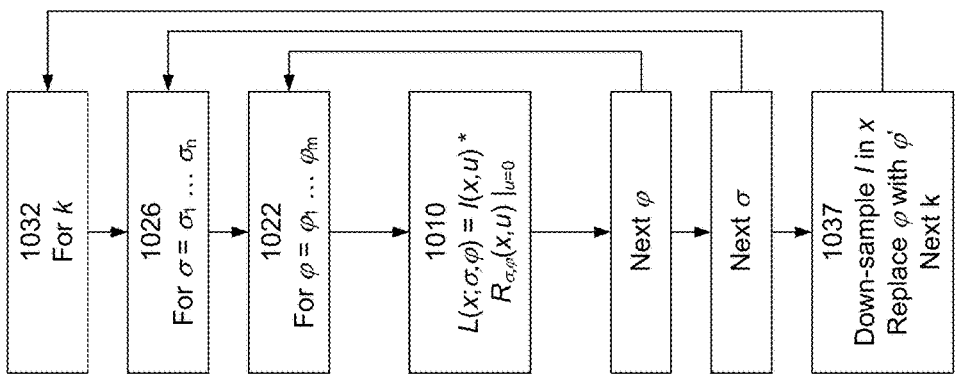
FIGS. 10A-10C are flow diagrams showing different example methods for calculating a Ray-Gaussian transform.

These two properties of the Ray-Gaussian transform indicate that we can build the transform $\mathcal{L}(x; \sigma, \varphi)$ of light field I in several ways. FIG. 10A shows a direct approach. In this approach, I is convolved 1010 with $\mathcal{R}_{\sigma,\varphi}$, for $\sigma\in\{\sigma_1, \ldots, \sigma_n, 2\sigma_1, \ldots, 2\sigma_n, \ldots, 2^k\sigma_1, \ldots, 2^k\sigma_n\}$ and for $\varphi\in\{\varphi_1, \ldots, \varphi_m\}$. In this formulation, n is the number of samples per octave of scale and (k+1) is the number of octaves, and m is the number of samples in the depth domain. The downsampling factor is chosen as 2, although other factors p could also be used. In FIG. 10A this is implemented by two loops 1022, 1024.

Figure 10B:
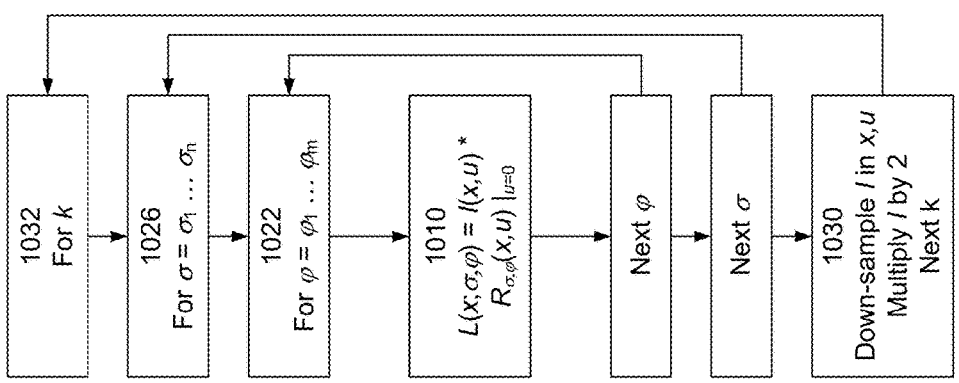
Figure 10A:
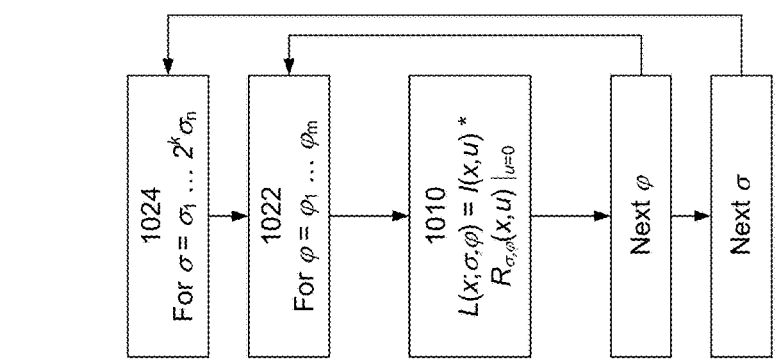

FIG. 10B uses the propositions above to reduce the amount of computation by downsampling and forming a pyramid similar to the one in FIG. 8B. This can be especially useful for large light fields. In this approach, I is convolved with $\mathcal{R}_{\sigma,\varphi}$, for $\sigma\in\{\sigma_1, \ldots, \sigma_n\}$ and for $\varphi\in\{\varphi_1, \ldots, \varphi_m\}$, as indicated by loops 1022 and 1026 in FIG. 10B. Note that the values of $\sigma$ span less than an octave, which is much less compared to FIG. 10A. I is then downsampled 1030 by 2, and the down-sampled I is multiplied by 2 (according to equation (17)) and convolved with $\mathcal{R}_{\sigma,\varphi}$, for $\sigma\in\{\sigma_1, \ldots, \sigma_n\}$ and for $\varphi\in\{\varphi_1, \ldots, \varphi_m\}$. This convolution requires less computation because/has been down-sampled. This is repeated (k−1) times in loop 1032.

FIG. 10C is similar to FIG. 10B, except that the downsampling 1037 occurs only in x and not in u. In that case, for each downsampling, the depth values $\varphi$ are also changed 1037. That is, after downsampling, the down-sampled I is convolved with $\mathcal{R}_{\sigma,\varphi}$, for $\sigma\in\{\sigma_1, \ldots, \sigma_n\}$ and for $\varphi\in\{\varphi'_1, \ldots, \varphi'_m\}$.

We can also show that similar properties hold for transforms built upon the first and second derivatives of the Ray-Gaussian. For the construction of first derivative Ray-Gaussian transforms $\mathcal{L}'(x; \sigma, \varphi)$, we can use the "normalized" Ray-Gaussian derivative $$\mathcal{R}'_{\sigma,\varphi} = \sigma\frac{d}{dx}\mathcal{R}_{\sigma,\varphi}$$

to implement approaches similar to those shown in FIGS. 10A-10C. For construction of second derivative Ray-Gaussian transforms $\mathcal{L}''(x; \sigma, \varphi)$, we can use the "normalized" Ray-Gaussian second derivative:

$$\mathcal{R}''_{\sigma,\varphi} = \sigma^2\frac{d^2}{dx^2}\mathcal{R}_{\sigma,\varphi}$$

to implement approaches similar to those shown in FIGS. 10A-10C.

The scale-depth transform can be processed in different ways to achieve different purposes. In one application, the (image,scale,depth) domain representation of the three-dimensional scene is processed to estimate depth or disparity in the three-dimensional scene. The following example is based on detecting rays in (x,u) space along with their position in the slice, their width (based on $\sigma$) and their angle (based on $\varphi$).

FIG. 10D shows a flow diagram illustrating disparity estimation based on the Ray-Gaussian transform. Here, the transformation 1010 is based on the normalized second derivative Ray Gaussian transform $\mathcal{L}''(x; \sigma; \varphi)=I*\mathcal{R}''_{\sigma,\varphi})(x,u)|_{u=0}$. Further processing 1090 is based on finding extrema (local minima and maxima) of $\mathcal{L}''(x; \sigma, \varphi)$. The parameters of extrema points $\{(x_p, \sigma_p, \varphi_p)\}$ give the following information about each ray p:

position of the center of the ray $x_p$
width of the ray $2\sigma_p$
angle of the ray $\varphi_p$ From the angle $\varphi_p$ we can get the depth $d_p$ of that ray (i.e., depth of the corresponding points in the three-dimensional scene) by using camera calibration parameters such as $d_p=fb/\tan(\varphi_p)$, where f is camera focal length and b is inter-camera distance. For plenoptic cameras, we can evaluate a more precise angle-depth value assignment by simulating the plenoptic image formation using ray tracing or wave propagation. This second approach encompasses a more precise use of optical parameters in depth estimation.

After we have detected the rays and found their parameters, we can further refine the results by applying additional techniques. One technique resolves occlusion conflicts 1092 between overlapping rays. Since we have the position and width for each ray, we can find sets of rays that overlap, such as shown in FIG. 2D. Once we have found overlapping rays, we can decide the ordering of rays from the foreground to the background. Because larger angle of rays indicates smaller depth (closer objects, larger parallax), rays with larger angles should be in the foreground. Alternately, we can remove occluded rays before performing the processing shown in FIG. 10D.

We can assign disparity or depth 1094 to pixels by combining information from detected rays that remained after the occlusion detection 1092. We can also combine information from rays detected by processing scale-depth spaces from (x,u) slices and scale-depth spaces from (y,v) slices of the light field. Slices (x,u) correspond to views with horizontal parallax and slices (y,v) correspond to views with vertical parallax. For pixels with multiple options for assignment (i.e., multiple rays), we may choose the assignment with a higher confidence value. All other factors being equal, we pick the ray with the highest absolute value of the scale-depth space for that pixel.

Plenoptic Imaging System

Figure 11:
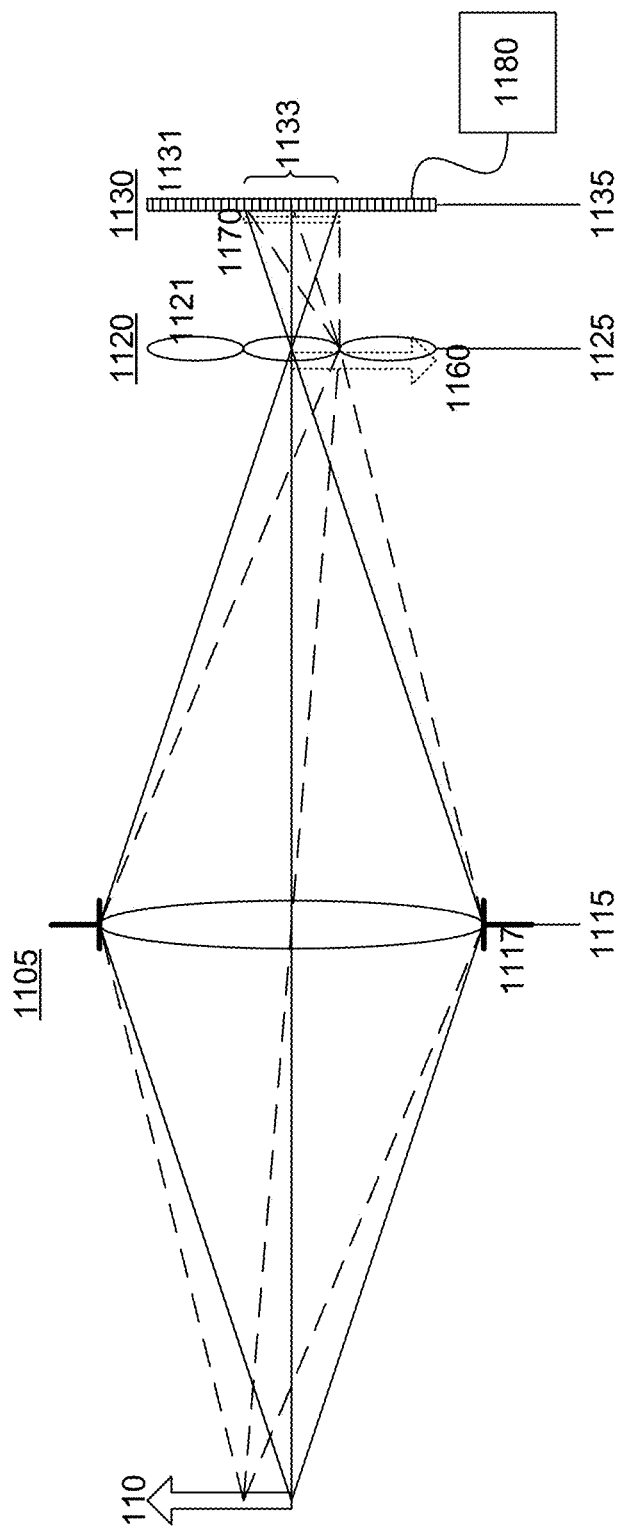
FIG. 11 is a diagram of a plenoptic imaging system, according to one embodiment.

FIG. 11 is a diagram of a plenoptic imaging system capable of capturing light field images suitable for use with the approaches described above. The system captures a plenoptic image of the scene 110. The plenoptic image is inherently a multi-view image of the scene 110. The plenoptic imaging system includes an image-forming optical module 1105, which in FIG. 11 is represented by a single lens element although it is understood that the optical module 1105 could contain multiple elements and/or non-lens elements (e.g., mirrors). The optical module 1105 forms a conventional optical image 1160 of scene 110. The optical module 1105 may also be referred to as the primary imaging module, subsystem or system. The optical image 1160 is formed at an image plane 1125 of the optical module 1105. The optical module 1105 is characterized by a pupil 1117 and pupil plane 1115, which in FIG. 11 is represented by a physical aperture stop co-located with the single lens element. In more complex optical modules 1105, the pupil 1117 and pupil plane 1115 need not be co-located with any of the optical elements within the optical module.

In a conventional imaging system, a detector array would be located at image plane 1125 to capture the optical image 1160. However, this is not the case for the plenoptic imaging system in FIG. 11. In this particular example, an array 1120 of micro-imaging elements 1121 is located at the image plane 1125. In FIG. 11, the micro-imaging elements 1121 are shown as microlenses. Other elements can also be used, for example, an array of pinholes. The detector array 1130 is located behind (i.e., optically downstream of) the micro-imaging array 1120. More specifically, the detector array 1130 is positioned in a conjugate plane 1135 to the pupil plane 1115. That is, each micro-imaging element 1121 creates an image of the pupil plane 1115 at the conjugate plane 1135, which image is captured by the detector array 1130.

In the case of microlenses, each microlens 1121 forms an image 1170 of the pupil at the detector plane 1135. The image of the pupil is captured by a subset of detectors 1131 in the detector array 1130. Each microlens 1121 forms its own image 1170. Thus, the overall plenoptic image formed at detector plane 1135 will include an array of images 1170, one for each microlens 1121. This arrayed imaging effectively subdivides the detector array into superpixels 1133, each of which contains multiple detectors 1131. Each microlens 1121 images the pupil onto the corresponding superpixel 1133, with each pupil image then captured by detectors in the corresponding superpixel.

Each detector 1131 collects the rays that travel through a portion of the pupil 1117. Each microlens 1121 collects the rays that originate from a portion of the scene 110. Thus, each detector 1131 collects the rays traveling in a certain direction from a portion of the scene 110. That is, each detector 1131 collects a small portion of the overall image of the scene, as taken from a specific viewpoint. By aggregating the data collected by detectors 1131 which are operating from the same viewpoint, a complete image of the scene from that viewpoint can be constructed. By aggregating all the images from different viewpoints, a complete light field for the scene can be constructed. In FIG. 11, a processor 1180 collects the data from the detector array 1130 and processes it accordingly. Processor 1180 may also perform the LF transform and other processing described above.

FIG. 11 shows the capture of a light field by a plenoptic imaging system. As mentioned previously, other types of light field imaging systems can also be used, for example camera arrays.

Many plenoptic cameras have particular optical properties that result in specific structure of light fields obtained from these cameras. This structure is reflected in a deterministic relation between scale and angle of rays in the (image,view) domain of the light field. For example, plenoptic cameras with a main lens focused far away (e.g. at the "hyperfocal distance" of the lens) produce light fields where rays characterized by a small parallax angle have small blur (or no blur) and rays characterized by larger parallax angles have larger blur. Since blur (smoothness) affects the level of scale at which the ray is detected through scale-depth processing, there is a deterministic relation between depth and scale. These type of relations can be advantageously exploited for reducing the complexity of search through the (image,scale,depth) space. For example, if there is a one-to-one relation between scale and depth given by a function f, the three-dimensional search within the (image,scale,depth) space can be reduced to a two-dimensional search within (image,f (scale,depth)). This can be exploited in both examples of application to depth estimation and 3D feature detection, as well as in other applications of scale-depth processing.

In the case that the main lens is focusing at an object closer than the hyperfocal distance, light field containing objects closer than the focusing distance are characterized by rays with larger parallax angles and larger blur. Objects further then the focusing distance are characterized by larger negative parallax angles and larger blur.

Although the detailed description contains many specifics, these should not be construed as limiting the scope of the invention but merely as illustrating different examples and aspects of the invention. It should be appreciated that the scope of the invention includes other embodiments not discussed in detail above. For example, light fields can be captured by systems other than plenoptic imaging systems, such as multi-aperture optical systems (a system with multiple lenses and one sensor array) or camera arrays with non-regular arrangements of cameras. Various other modifications, changes and variations which will be apparent to those skilled in the art may be made in the arrangement, operation and details of the method and apparatus of the present invention disclosed herein.

What is claimed is:

1. A computer-implemented method for segmenting a scene into objects based on light field data for the scene, the method implemented on a processor executing instructions and the method comprising:
  accessing light field data for the scene, the light field data including a plurality of images of the scene taken from different viewpoints, the images comprising pixels having image pixel values;
  from the light field data, estimating one or more disparity maps for the scene taken from different viewpoints; and
  segmenting the scene into variable-depth regions that correspond to objects in the scene, the variable-depth regions defined by boundaries, at least one boundary of the boundaries defining at least one variable-depth region of the variable-depth regions determined by varying the at least one boundary to optimize an objective function for the at least one-variable-depth region; wherein:
    the objective function for the at least one variable-depth region is based in part on a similarity function that measures a similarity of image pixel values for pixels within the at least one boundary defining the at least one variable-depth region;
    the similarity function takes a form of $$S(x, L) = \left[ D(x, p_x) - \frac{1}{|L|} \sum_{x \in L} D(x, p_x) \right]^2$$

where x denotes a pixel in the image, $p_x$ is a disparity of that pixel x, $D(x, p_x)$ is a descriptor function, L is the at least one variable-depth region within the at least one boundary, and |L| denotes a cardinality of region L; and
    the descriptor function $D(x, p_x)$ is based on:

$$[\mu(x, p_x)]^2$$

where $\mu(x, p_x)$ is a mean image pixel value for all pixels along an epipolar line that passes through the pixel x with the associated disparity $p_x$.

2. The method of claim 1 wherein the similarity function also measures a similarity of disparities for pixels within the at least one variable-depth region defined by the at least one boundary.

3. The method of claim 1 wherein the objective function is further based in part on a second similarity function that measures a similarity of pixels outside the at least one variable-depth region defined by the at least one boundary.

4. The method of claim 3 wherein the similarity function for pixels within the at least one variable-depth region has a same functional form as the similarity function for pixels outside the at least one variable-depth region.

5. The method of claim 1 wherein the objective function is further based in part on a factor that measures a length of the at least one boundary defining the at least one variable-depth region.

6. The method of claim 1 wherein the descriptor function $D(x, p_x)$ is based on:

$$[I(x) - \mu(x, p_x)]^2$$

where I(x) is the image pixel value for pixel x.

7. The method of claim 1 wherein the similarity function is based on a descriptor function that is calculated for a plurality of different viewpoints.

8. The method of claim 1 wherein the similarity function is based on a descriptor function that is calculated for a plurality of different color channels.

9. The method of claim 1 wherein varying the at least one boundary to optimize an objective function for the at least one variable-depth region comprises:
  evaluating the similarity function for an initial boundary for the at least one boundary and evolving the at least one boundary based on an active contour framework.

10. The method of claim 1 wherein estimating one or more disparity maps comprises estimating the disparity maps based on epipolar structure in the light field data.

11. The method of claim 1 wherein estimating one or more disparity maps accounts for occlusions in the scene.

12. The method of claim 1 wherein estimating one or more disparity maps is based on a Ray-Gaussian transform.

13. The method of claim 1 further comprising:
  capturing the light field data for the scene before accessing the light field data.

14. The method of claim 1 wherein the light field data is light field data for an interior of an ear canal, and segmenting the scene into a plurality of regions comprises segmenting the scene into a tympanic membrane region and a background region.

15. A computer-implemented method for segmenting a scene into objects based on light field data for the scene, the method implemented on a processor executing instructions and the method comprising:
  accessing light field data for the scene, the light field data including a plurality of images of the scene taken from different viewpoints, the images comprising pixels having image pixel values;
  from the light field data, estimating one or more disparity maps for the scene taken from different viewpoints; and
  segmenting the scene into variable-depth regions that correspond to objects in the scene, the variable-depth regions defined by boundaries, at least one boundary of the boundaries defining at least one variable-depth region of the variable-depth regions determined by varying the at least one boundary to optimize an objective function for the at least one variable-depth region; wherein:
    the objective function for the at least one variable-depth region is based in part on a similarity function that measures a similarity of image pixel values for pixels within the at least one boundary defining the at least one variable-depth region;
    the similarity function takes a form of $$S(x, L) = \left[ D(x, p_x) - \frac{1}{|L|} \sum_{x \in L} D(x, p_x) \right]^2$$

where x denotes a pixel in the image, $p_x$ is a disparity of that pixel x, $D(x, p_x)$ is a descriptor function, L is the at least one variable-depth region within the at least one boundary, and |L| denotes a cardinality of region L; and the descriptor function $D(x, p_x)$ is based on:

$$w_I I(x) + w_P P(x)$$

where $I(x)$ is the image pixel value for pixel x, $P(x)$ is the disparity for pixel x, and $w_I$ and $w_P$ are weights.

16. A computer-implemented method for segmenting a scene into objects based on light field data for the scene, the method implemented on a processor executing instructions and the method comprising:

accessing light field data for the scene, the light field data including a plurality of images of the scene taken from different viewpoints, the images comprising pixels having image pixel values;

from the light field data, estimating one or more disparity maps for the scene taken from different viewpoints; and segmenting the scene into variable-depth regions that correspond to objects in the scene, the variable-depth regions defined by boundaries, at least one boundary of the boundaries defining at least one variable-depth region of the variable-depth regions determined by varying the at least one boundary to optimize an objective function for the at least one variable-depth region; wherein:

the objective function for the at least one variable-depth region is based in part on a similarity function that measures a similarity of image pixel values for pixels within the at least one boundary defining the at least one variable-depth region;

the similarity function takes a form of $$S(x, L) = \left[ D(x, p_x) - \frac{1}{|L|} \sum_{x \in L} D(x, p_x) \right]^2$$

where x denotes a pixel in the image, $p_x$ is a disparity of that pixel x, $D(x, p_x)$ is a descriptor function, L is the at least one variable-depth region within the at least one boundary, and $|L|$ denotes a cardinality of region L; and the descriptor function $D(x, p_x)$ is based on:

$$w_I \|\nabla I(x)\| + w_P \|\nabla P(x)\|$$

where $I(x)$ is the image pixel value for pixel x, $P(x)$ is the disparity for pixel x, and $w_I$ and $w_P$ are weights, and $\|.\|$ denotes the magnitude.

* * * * *